(12) United States Patent
Bhatia et al.

(10) Patent No.: US 7,207,737 B2
(45) Date of Patent: Apr. 24, 2007

(54) THERMAL TRANSFER PRINTER COVER

(75) Inventors: Chandrakant Bhatia, Libertyville, IL (US); David A. Haas, Schaumburg, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 130 days.

(21) Appl. No.: 10/949,921

(22) Filed: Sep. 24, 2004

(65) Prior Publication Data

US 2006/0067778 A1    Mar. 30, 2006

(51) Int. Cl.
*B41J 29/00* (2006.01)
*B41J 2/32* (2006.01)

(52) U.S. Cl. .................. 400/693; 347/222; 150/165
(58) Field of Classification Search ............ 150/165
See application file for complete search history.

(56) References Cited

U.S. PATENT DOCUMENTS

| | | | | |
|---|---|---|---|---|
| 1,910,981 A | * | 5/1933 | Bescherer ............... 181/201 |
| 2,701,618 A | * | 2/1955 | Montgomery ............ 181/201 |
| 2,996,002 A | * | 8/1961 | Adler et al. ............. 101/269 |
| 3,087,578 A | * | 4/1963 | Reed et al. .............. 181/201 |
| 3,476,210 A | * | 11/1969 | Carlson .................. 181/201 |
| 4,215,762 A | * | 8/1980 | Cunningham et al. ..... 181/201 |
| 4,550,798 A | * | 11/1985 | Swartz et al. ............ 181/201 |
| 4,645,275 A | * | 2/1987 | Pucci .................... 312/223.2 |
| 4,726,699 A | * | 2/1988 | Buschmann et al. ...... 400/690 |
| 4,729,452 A | * | 3/1988 | Sims .................... 181/201 |
| 4,930,917 A | * | 6/1990 | Watahiki et al. ......... 400/690 |
| 5,017,032 A | * | 5/1991 | Green ................... 400/693 |
| 5,056,331 A | | 10/1991 | Lotz |
| 5,281,018 A | * | 1/1994 | Cullinan ................. 312/223.2 |
| 5,417,488 A | * | 5/1995 | Horton .................. 312/208.3 |
| 5,782,687 A | * | 7/1998 | Sniegocki ............... 454/184 |
| 5,886,457 A | | 3/1999 | Maesaka et al. |
| 6,271,872 B1 | | 8/2001 | Nagata |
| 2001/0014245 A1 | * | 8/2001 | Seres et al. ............. 400/693 |
| 2003/0100257 A1 | | 5/2003 | Uchioke et al. |
| 2005/0280338 A1 | * | 12/2005 | Van Leeuwen .......... 312/223.1 |

FOREIGN PATENT DOCUMENTS

| | | | |
|---|---|---|---|
| JP | 08058190 A | * | 3/1996 |
| JP | 09110060 A | * | 4/1997 |
| JP | 2003025685 A | * | 1/2003 |
| JP | 2003118201 A | * | 4/2003 |

OTHER PUBLICATIONS

International Search Report for PCT/EP2005/010271, mailed May 11, 2006.

* cited by examiner

*Primary Examiner*—Daniel J. Colilla
(74) *Attorney, Agent, or Firm*—McAndrews, Held & Malloy, Ltd.

(57) ABSTRACT

A system and method of protecting a printer housing against moisture infiltration, including affixing a fixed covering portion over the printer housing, wherein the affixing includes exposing a printing opening of the printer housing, and securing a removable covering portion to the fixed covering portion, wherein the removable covering portion covers the printing opening.

27 Claims, 4 Drawing Sheets

THERMAL TRANSFER PRINTER COVER

BACKGROUND OF THE INVENTION

Embodiments of the present invention generally relate to a cover for a thermal transfer printer, and more particularly to a cover that protects against moisture infiltration when the thermal transfer printer is being cleaned.

A typical thermal transfer printer system is fully programmable and capable of delivering variable information with every print. The system uses a high resolution print head in order to print characters varying from simple text to complex logos and a range of industrial bar codes. Each printer system uses thermal transfer technology that allows an operator to print directly on packaging material, instead of using separate labels.

Thermal transfer printers are used in various industries, such as the food packaging industry. For example, thermal transfer printers are used to print information on flexible packaging used in the snack food industry.

A typical packaging line includes various support structure and components in addition to a thermal transfer printer system. The support structures and components are periodically washed, such as through power washing, in order to maintain the efficiency and integrity of the packaging line and process.

During a wash process, a thermal transfer printer is typically removed from a production line, or a plastic sheet is placed over the printer. Often, the printer is located in a position that is not conveniently accessible. As such, it may prove difficult to cover the printer in such a manner.

Thus, a need exists for an efficient system and method of protecting a thermal transfer printer during a washing process. Further, a need exists for a system and method of quickly and easily covering and uncovering the printer.

BRIEF SUMMARY OF THE INVENTION

Embodiments of the present invention provide a thermal transfer printing system including a printer housing, a platen member, a first covering portion, or hood, and a second covering portion, or front cover. The printer housing includes a printhead, print media, and an opening, wherein the printhead is configured to urge the print media through the opening during a printing process.

The platen member is positioned proximate the opening, and a substrate gap is defined between the platen member and the opening. A substrate, such as film, paper, cloth, or the like, is passed through the substrate gap and is sandwiched between the print media and the platen member when the printhead urges the print media through the opening during a printing process.

The hood is affixed to the printer housing, and the front cover is removably secured to the hood. The printer housing is completely covered by the first and second covering portions. At least one of the hood and the front cover includes at least one seal member that forms a fluid-tight seal between the hood and the front cover when the front cover is secured to the hood. A gasket may be interposed between the hood and the printer housing. The hood and front cover may be formed of stainless steel, plastic, rubber, glass, plexiglass, or various other materials that are substantially impermeable to fluid, or otherwise prevent moisture from passing therethrough.

The system may also include a pivoting or sliding bracket operatively connected to the platen member, which may be a platen roller or plate. The pivoting or sliding bracket is configured to move the platen member away from the printer housing.

Embodiments of the present invention also provide a method of protecting a printer housing against moisture infiltration. The method includes affixing a fixed covering portion over the printer housing. The affixing step includes exposing a printing opening of the printer housing. The method also includes securing a removable covering portion to the fixed covering portion, wherein the removable covering portion covers the printing opening. The securing step includes providing a sealing engagement between the fixed and removable covering portions. Further, the securing may include snapably, threadably or latchably securing the removable covering portion to the fixed covering portion.

The method also includes completely covering the printer housing when the removable covering portion is secured to the fixed covering portion. The method may also include providing a sealing member between the fixed covering portion and the printer housing.

Figure 1:
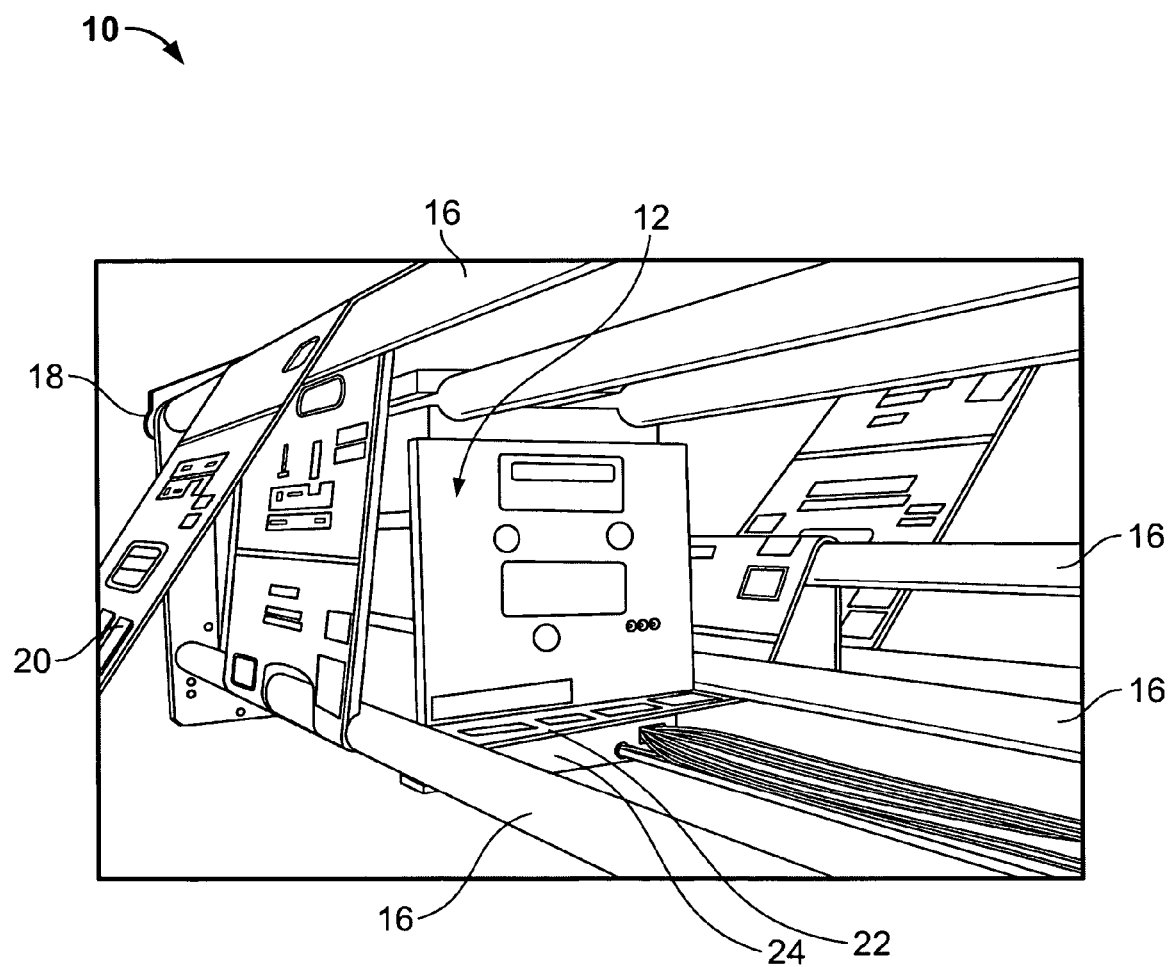
FIG. 1 illustrates an isometric view of a thermal transfer printer system, according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates an isometric view of a thermal transfer printer system 10, according to an embodiment of the present invention. The system 10 includes a printer housing 12 and a substrate delivery and support structure 14 including a series of substrate support shafts 16 connected to a support bracket 18. The bracket 18 may also support the printer housing 12. Some or all of the substrate support shafts 16 may be rotatable. A printing substrate, such as paper, cloth, web material, foil 20, or the like, is passed through, and supported by, the shafts 16. The foil 20 passes through a gap 22 that is defined between the printer housing 12 and a platen support 24. In order to print characters on the foil 20, the platen support 24 may be urged toward the printer housing 12, and a high temperature print head (not shown in FIG. 1) is urged toward the plate support 24, thereby sandwiching the passing foil 20 therebetween. The high temperature print head then transfers print media from a ribbon (not shown in FIG. 1) to the foil 20. Once the desired characters are printed on the foil 20, the foil 20 passes out of the gap 22. In general, the foil 20 may be continuously passed through the gap 22 at a constant or variable rate.

Figure 2:
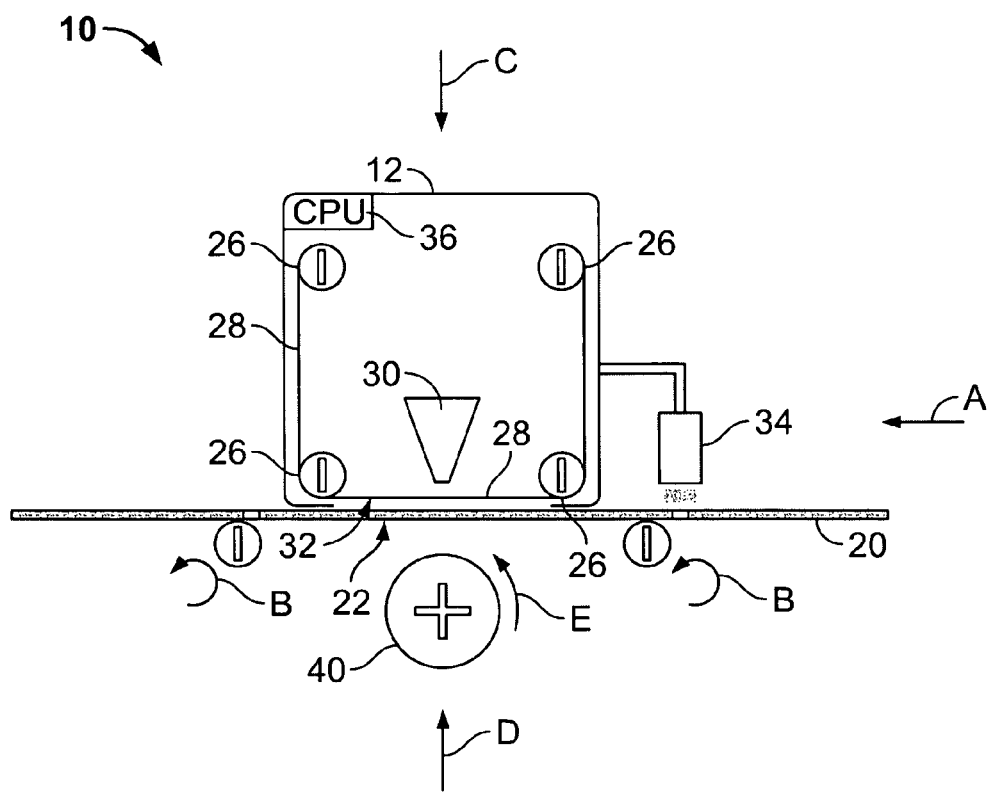
FIG. 2 illustrates a schematic representation of a thermal transfer printer system, according to an embodiment of the present invention.

FIG. 2 illustrates a schematic representation of the thermal transfer printer system 10. The printer housing 12 includes a series of rollers 26 that support a print ribbon 28. The ribbon 28 passes between a print head 30 and an opening 32 of the printer housing 12. A mark sensor 34 is operatively connected to the printer housing 12 and is configured to detect printing cues located on the foil 20.

The foil 20 is continually passed through the gap 22 in the direction of arrow A. That is, the foil 20 does not cease moving during printing. The shafts 16 may rotate in the direction of arrows B in order to assist the movement of the foil 20 through the gap 22. Optionally, the shafts 16 may be fixed.

As the foil 20 moves in the direction of arrow A, the mark sensor 34 detects printing cues on the foil 20. The mark sensor 34 then sends a signal to a processing unit 36. The processing unit 36 may alternatively be remotely located from the printer housing 12. The processing unit 36 then activates the print head 30 at an appropriate time based on the data received from the mark sensor 34.

In order to print characters on the foil 20 as it passes through the gap 22, the print head 30 is moved through the opening 32 toward a platen roller 40 in the direction of arrow C, while the platen roller 40 may or may not be urged toward the print head 30 in the direction of arrow D. The print head 30 and the platen roller 40 sandwich the moving foil 20 and the ribbon 28 therebetween. The ribbon 28 moves along with, or optionally in opposition to, the foil 20 in the direction of arrow A as the print head 30 engages the ribbon 28, which is indexed by the rollers 26. The platen roller 40 rotates in the direction of arrow E as the foil 20 and ribbon 28 are sandwiched between the print head 30 and the platen roller 40, and the high temperature print head 30 transfers print media from the ribbon onto the foil 20.

Figure 3:
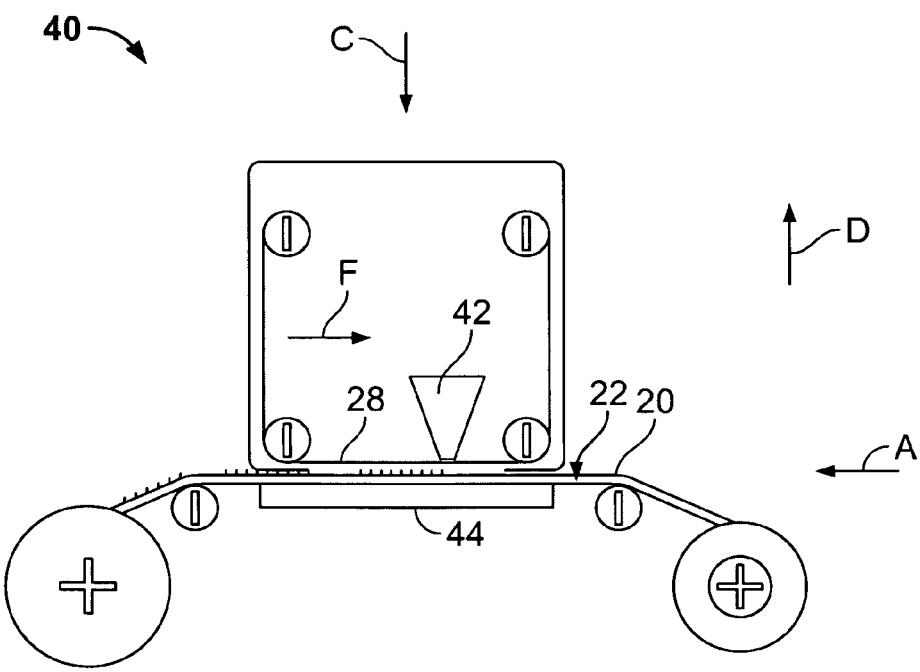
FIG. 3 illustrates a schematic representation of a thermal transfer printer system, according to an alternative embodiment of the present invention.

FIG. 3 illustrates a schematic representation of the thermal transfer printer system 10, according to an alternative embodiment of the present invention. In this embodiment, the foil 20 is passed through the gap 22 in the direction of arrow A. However, during printing, the movement of the foil 20 is stopped. The print head 42 is then moved toward the fixed platen pad 44 in the direction of arrow C, and in the process, urges the ribbon 28 and the foil 20 into the platen pad 44. The print head 42 is then moved in the direction of arrow F as it continues to print characters on the foil 20. Once the printing process is complete, the print head 42 is moved away from the platen pad 44 in the direction of arrow D, and is also moved back to a home position in the direction of arrow A. The foil 20 then moves through the gap in the direction of arrow A.

Figure 4:
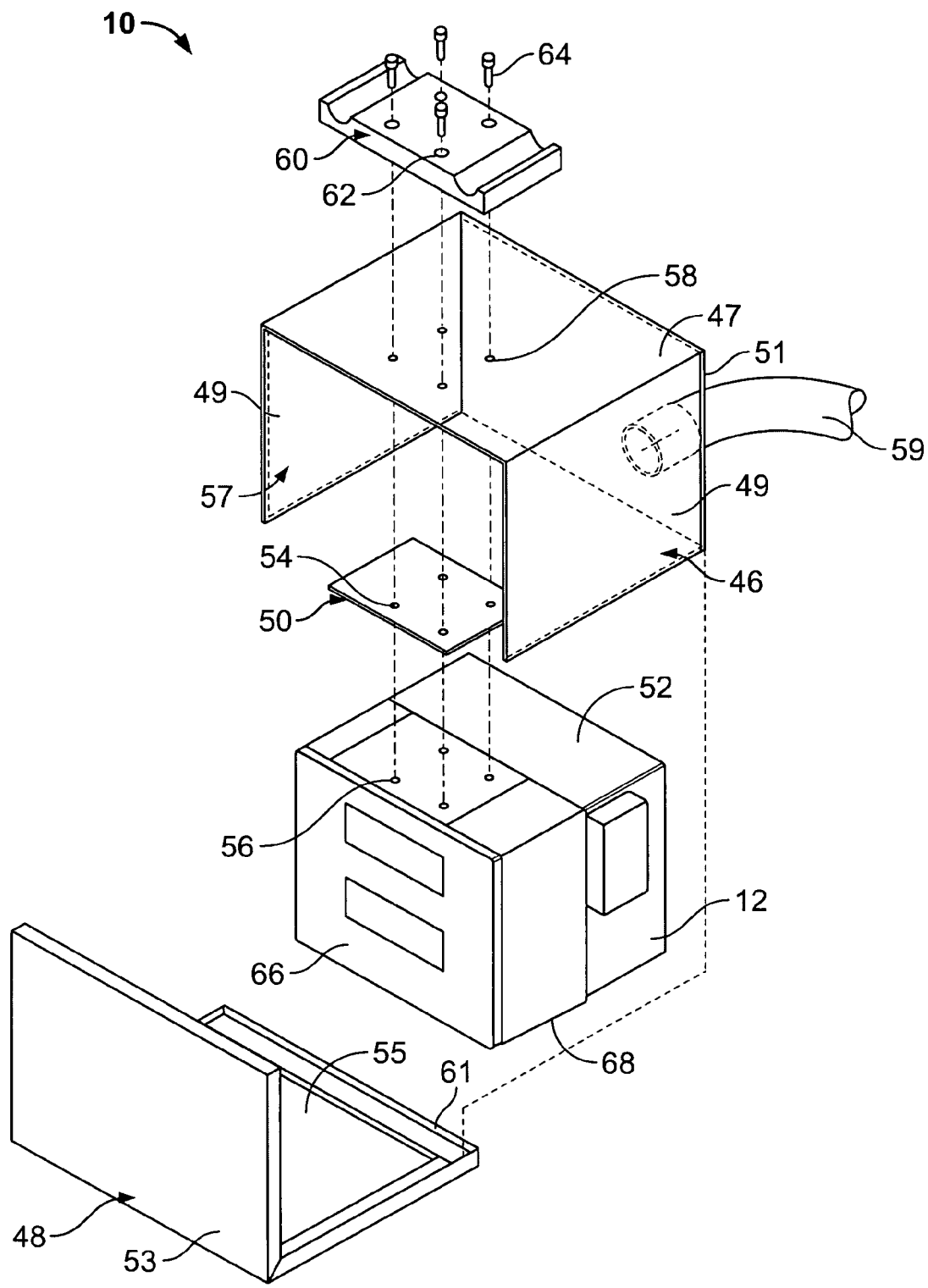
FIG. 4 illustrates an isometric partial exploded view of a thermal transfer printer system, according to an embodiment of the present invention.

FIG. 4 illustrates an isometric partial exploded view of the thermal transfer printer system 10. Various support and print structures (e.g., the rollers and the platen roller) are not shown in FIG. 4 for the sake of clarity. The system 10 includes the printer housing 12 positioned within a hood 46 and a removable front cover 48. The hood 46 and the front cover 48 may be formed of stainless steel, plastic, rubber, plexiglass or various other materials that prevent fluid from passing therethrough.

The hood 46 includes an upper surface 47, integrally formed with lateral walls 49, and a rear wall 51, defining a printer housing chamber 57 therebetween. A cable conduit 59 extends outwardly from the rear wall 51, and provides a fluid-tight path for cabling and wiring (not shown) of the printer housing 12 to pass. The front cover 48 includes a front face plate 53 integrally formed with a base member 55. A seal member 61 extends around the inner periphery of the front face plate 53 and the base member 55. The front cover 48 is configured to sealingly secure to the hood 46, thereby providing a fluid-tight barrier between the printer housing 12 and an outside environment. That is, the secure sealing engagement between the front cover 48 and the hood 46 prevents fluid from infiltrating into the printer housing chamber 57.

A gasket 50, formed of neoprene, rubber, or otherwise elastomeric material, is positioned on a top surface 52 of the printer housing 12. Fastener through holes 54 are formed through the gasket 52 and are aligned with fastener receptacles 56 formed through the upper surface 52 of the printer housing 12. The hood 46 also includes fastener through holes 58 formed through the upper surface 47. The hood 46 is positioned over the printer housing 12 so that the fastener through holes 58 are aligned with the fastener through holes 54 of the gasket 50 and the fastener receptacles 56 of the printer housing 12.

The hood 46 is mounted to a mounting bracket 60 having fastener through holes 62 that are aligned with the fastener through holes 58. Fasteners 64 pass through the fastener through holes 58, 54 and are securely retained within the fastener receptacles 56 of the printer housing 12. Thus, the hood 46 is secured to the mounting bracket 60, which is secured to a support structure (not shown), and the printer housing 12, with the gasket being sealingly sandwiched between the hood 46 and the top surface 52 of the printer housing 12. The gasket 50 prevents moisture infiltration through the through holes 58 of the hood 46.

Optionally, the hood 46 may be fastened to the mounting bracket 60 and/or the printer housing 12 in a variety of other ways. For example, the hood 46 may be bonded, or welded to the mounting bracket 60 and/or the printer housing 12. Alternatively, the hood 46 may snapably, latchably, or otherwise securely engage the printer housing 12 and/or the mounting bracket 60.

During a printing operation, the front cover 48 is removed from the hood 46 in order to allow access to the printer housing 12. As such, the front face 66 and the underside 68, which is proximate the gap 22 shown in FIGS. 2 and 3, are exposed.

When the system 10 is to be washed, the front cover 48 is sealingly secured to the hood 46. The face plate 53 of the front cover 48 sealingly engages the front edges of the upper surface 47 and lateral walls 49 of the hood 46, while the base member 55 sealingly engages the lower edges of the lateral and rear walls 49 and 51. The front cover 48 may snapably, latchably, or otherwise removably and sealingly engage the hood 46 to provide protection against moisture infiltration.

The hood 46 is configured to remain fixed to the printer housing 12, as discussed above, while the front cover 48 is configured to be removed from the hood 46 during a printing operation. Thus, the hood 46 remains permanently fixed to the printer housing 12 during printing and washing processes.

Alternatively, the front cover 48 may include the lateral walls 49, instead of the lateral walls 49 being integrally formed with the hood 46. Further, instead of including a rigid front cover 48, a retractable, flexible elastomeric or neoprene sheet may be included with the hood. The sheet or film may be rolled into open and closed positions with respect to the hood.

Figure 5:
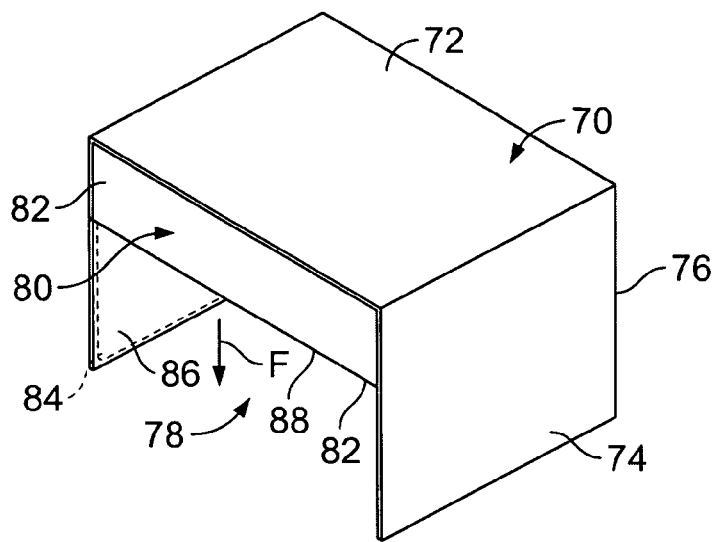
FIG. 5 illustrates an isometric view of a printer housing cover, according to an alternative embodiment of the present invention

FIG. 5 illustrates an isometric view of a printer housing cover 70, according to an alternative embodiment of the present invention. The cover 70 includes a top surface 72 integrally formed with lateral walls 74 and a rear wall 76, defining a printer housing chamber 78 therebetween. A retractable, flexible, fluid-proof covering member 80 is positioned underneath the top surface 72. The covering member 80 may be formed of flexible rubber, plastic, neoprene, or otherwise elastomeric material. Lateral edges 82 of the covering member 80 may slidably and sealingly secure to guide tracks 84 positioned on interior surfaces 86 of the lateral walls 74. The covering member 80 may be rolled onto a roller (not shown) positioned underneath the top wall 72.

In order to close the printer housing cover 70, the covering member 80 is pulled downward in the direction of arrow F, and is moved over the guide tracks until it engages an interior surface of the rear wall 76. The edge 88 of the covering member 80 may include a latch, snap, clasp, or the like configured to engage a reciprocal structure positioned on the interior surface of the rear wall 76. Thus, the printer housing cover 70 may be sealingly closed.

The covering member 80 may be manually moved over the guide tracks 84. Optionally, a motor (not shown) may be operatively connected to the covering member 80, such as through a roller support, in order to automatically open and close the printer housing cover 70.

Figure 6:
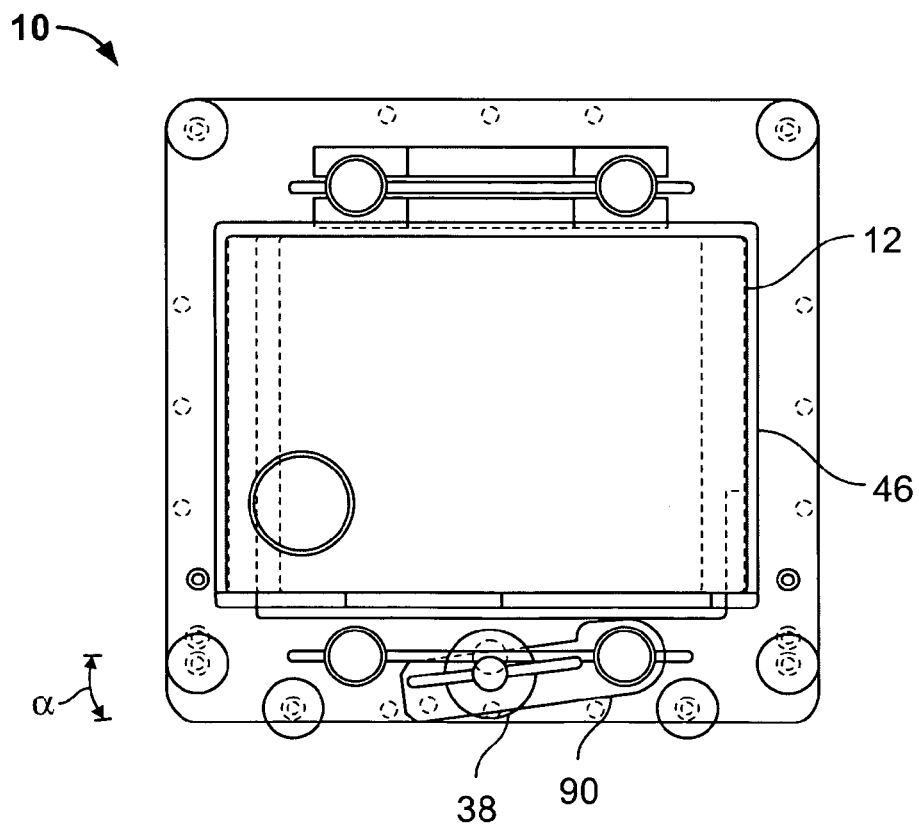
FIG. 6 illustrates a side view of a thermal transfer printer system according to an embodiment of the present invention.

FIG. 6 illustrates a side view of the thermal transfer printer system 10. The platen roller 40 may be operatively connected to a pivoting bracket 90 that allows the platen roller 40 to be moved over a range of motion shown by angle α. The platen roller 40 is pivoted by way of the pivoting bracket 90 in order to allow a larger clearance area for the front cover 48 to be sealingly secured to the hood 46. The platen roller 40 may be manually pivoted, or the pivoting bracket 90 may optionally be operatively connected to an actuator, which is configured to automatically pivot the platen roller 40.

Embodiments of the present invention provide an efficient system of protecting a printer housing from moisture infiltration during a washing process. Embodiments of the present invention also provide a system and method that allow a user to quickly and easily sealingly cover and uncover the printer housing.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. In a thermal transfer printer system having a printer housing, a platen member, and a clearance area defined between the printer housing and the platen member, the printer housing having a main body defined by top, bottom, lateral, front, and rear surfaces, and a printer opening defined through one of the surfaces, wherein the printer opening is configured to allow a printhead to pass therethrough in order to print characters on a substrate, a system for covering the printer housing comprising:
   a first covering portion that is affixed to the printer housing; and
   a second covering portion that is removably secured to the first covering portion, wherein the printer housing is completely covered by said first and second covering portions.

2. The system of claim 1, wherein said second covering portion comprises at least one seal member that sealingly engages said first covering portion when said second covering portion is secured to said first covering portion.

3. The system of claim 1, further comprising a gasket interposed between said first covering portion and said second covering portion.

4. The system of claim 1, wherein said first covering portion is a hood comprising a top wall integrally formed with lateral and rear walls.

5. The system of claim 4, wherein said second covering portion is a front cover comprising a front face integrally formed with a base member.

6. The system of claim 4, wherein said second covering portion is configured to cover at least the printer opening.

7. The system of claim 4, wherein said second covering portion is a retractable sheet housed within said hood.

8. The system of claim 4, wherein said hood does not cover the printer opening.

9. The system of claim 1, wherein at least one of said first and second covering portions are formed of at least one of stainless steel, plastic, rubber, glass, and plexiglass.

10. A thermal transfer printing system, comprising:
    a printer housing including a printhead, print media, and an opening, wherein said printhead is configured to urge said print media through said opening during a printing process;
    a platen member positioned proximate the opening, wherein a substrate gap is defined between said platen member and said opening, and wherein a substrate is sandwiched between said print media and said platen member when said printhead urges said print media through said opening during a printing process;
    a hood that is affixed to said printer housing; and
    a front cover that is removably secured to said hood, wherein said printer housing is completely covered by said hood and front cover.

11. The system of claim 10, wherein at least one of said hood and said front cover comprises at least one seal member that forms a fluid-tight seal between said hood and front cover when said front cover is secured to said hood.

12. The system of claim 10, further comprising a gasket interposed between said hood and said printer housing.

13. The system of claim 10, wherein said hood comprises a top wall integrally formed with lateral and rear walls.

14. The system of claim 10, wherein said front cover comprises a front face integrally formed with a base member.

15. The system of claim 10, wherein said hood does not cover the opening.

16. The system of claim 10, wherein said front cover is configured to cover at least said opening.

17. The system of claim 10, wherein said front cover is a retractable sheet housed within said hood.

18. The system of claim 10, wherein at least one of said hood and front cover are formed of at least one of stainless steel, plastic, rubber, glass, and plexiglass.

19. The system of claim 10, further comprising a movable bracket operatively connected to said platen member, wherein said movable bracket is configured to move said platen member away from said printer housing.

20. The system of claim 19, wherein said movable bracket is a pivoting bracket.

21. The system of claim 10, wherein said platen member is one of a platen roller and platen pad.

22. A method of protecting a printer housing against moisture infiltration, comprising:
   affixing a fixed covering portion over the printer housing, wherein said affixing allows a printer opening to remain exposed;
   securing a removable covering portion to the fixed covering portion, wherein the removable covering portion covers the printing opening; and
   moving a platen member away from the printer housing before securing the removable covering portion to the first covering portion.

23. The method of claim 22, further comprising completely covering the printer housing when the removable covering portion is secured to the fixed covering portion.

24. The method of claim 22, wherein said securing comprises providing a sealing engagement between the fixed and removable covering portions.

25. The method of claim 22, wherein said securing comprises at least one of snapably, threadably and latchably securing the removable covering portion to the fixed covering portion.

26. The method of claim 22, further comprising providing a sealing member between the fixed covering portion and the printer housing.

27. A method of protecting a printer housing against moisture infiltration, comprising:
   affixing a fixed covering portion over the printer housing, wherein said affixing includes exposing a printing opening of the printer housing;
   moving a platen member away from the printer housing; and
   securing a removable covering portion to the fixed covering portion after the platen member is moved away from the printer housing, wherein the removable covering portion covers the printing opening.

* * * * *